United States Patent
Tey

(10) Patent No.: US 12,514,840 B2
(45) Date of Patent: Jan. 6, 2026

(54) TREATMENT OF IDIOPATHIC HYPOHIDROSIS

(71) Applicant: NATIONAL SKIN CENTRE (SINGAPORE) PTE LTD, Singapore (SG)

(72) Inventor: Hong Liang Tey, Singapore (SG)

(73) Assignee: National Skin Centre (Singapore) PTE LTD, Singapore (SG)

( * ) Notice: Subject to any disclaimer, the term of this patent is extended or adjusted under 35 U.S.C. 154(b) by 997 days.

(21) Appl. No.: 17/635,852

(22) PCT Filed: Aug. 17, 2020

(86) PCT No.: PCT/SG2020/050476
§ 371 (c)(1),
(2) Date: Feb. 16, 2022

(87) PCT Pub. No.: WO2021/034272
PCT Pub. Date: Feb. 25, 2021

(65) Prior Publication Data
US 2022/0296554 A1    Sep. 22, 2022

(30) Foreign Application Priority Data
Aug. 19, 2019    (SG) .......................... 10 2019 07637P

(51) Int. Cl.
*A61K 31/203* (2006.01)
*A61K 9/00* (2006.01)
*A61P 17/00* (2006.01)

(52) U.S. Cl.
CPC .......... *A61K 31/203* (2013.01); *A61K 9/0053* (2013.01); *A61P 17/00* (2018.01)

(58) Field of Classification Search
CPC .................................................. A61K 31/203
See application file for complete search history.

(56) References Cited

FOREIGN PATENT DOCUMENTS

WO    2021/034272 A1    2/2021

OTHER PUBLICATIONS

Kakizaki et al. Australasian Journal of Dermatology, 2013, 54(4): e82-e84.*
Lim, Joel Hua-Liang, et al., "Hypohidrosis in Individuals with Exertional Heat Injury: A Prospective Open Cohort Study," Dermatology, 2016, pp. 50-56, vol. 232, No. 1, Karger AG, Basel.
Chia, K.Y., et al., "Approach to hypohidrosis," Journal of the European Academy of Dermatology and Venereology, 2013, pp. 799-804, vol. 27, No. 7, European Academy of Dermatology and Venereology.
Ohshima, Yuichiro, et al., "Classification of Systemic and Localized Sweating Disorders," Current Problems in Dermatology, 2016, pp. 7-10, vol. 51, S. Karger AG, Basel.
Fritsch, Peter O,. "Retinoids in psoriasis and disorders of keratinization," Journal of the American Academy of Dermatology, 1992, pp. s8-s14, vol. 27, No. 6, Part 2.
Kakizaki, Aya, et al., "Successful treatment of syringotropic CD8+ mycosis fungoides accompanied by hypohidrosis with vorinostat and retinoids," Australasian Journal of Dermatology, 2013, pp. e82-e84, vol. 54, No. 4, The Australasian College of Dermatologists.
Foreign communication from the priority International Application No. PCT/SG2020/050476, International Search Report and Written Opinion, Nov. 16, 2020, 10 pages.
Tey, H. L., et al., "In Vivo Imaging of Miliaria Profunda Using High-Definition Optical Coherence Tomography: Diagnosis, Pathogenesis, and Treatment," JAMA Dermatology, Mar. 2015, pp. 346-348, vol. 151, No. 3, American Medical Association.
Haenssle, H. A., et al., "Effective treatment of severe thermodysregulation by oral retinoids in a patient with recessive congenital lamellar ichthyosis," Clinical and Experimetnal Dermatology, Mar. 18, 2008, pp. 578-581, vol. 133, No. 5, Blackwell Publishing Ltd.
Munetsugu, Takichi, et al., "Revised guideline for the diagnosis and treatment of acquired idiopathic generalized anhidrosis in Japan" Journal of Dermatology, 2017, pp. 394-400, vol. 44, Japanese Dermatological Association.
Fukumoto, Takeshi, et al., "Acquired idiopathic partial anhidrosis successfully treated with adapalene geln" Journal of Dermatology, 2020, pp. e314-e315, vol. 47, Japanese Dermatological Association.

* cited by examiner

*Primary Examiner* — Rei Tsang Shiao
(74) *Attorney, Agent, or Firm* — Conley Rose, P.C.; Rodney B. Carroll

(57) ABSTRACT

The present invention provides a new treatment for idiopathic hypohidrosis. In one embodiment, the said treatment comprises administering to a patient in need a pharmaceutically effective amount of a retinoid. Preferably, the retinoid is isotretinoin or acitretin.

10 Claims, 5 Drawing Sheets

TREATMENT OF IDIOPATHIC HYPOHIDROSIS

CROSS-REFERENCE TO RELATED APPLICATIONS

The present application is a filing under 35 U.S.C. 371 as the National Stage of International Application No. PCT/SG2020/050476, filed Aug. 17, 2020, entitled "TREATMENT OF IDIOPATHIC HYPOHIDROSIS," which claims priority to Singapore Application No. SG 10201907637P filed with the Intellectual Property Office of Singapore on Aug. 19, 2019 and entitled "TREATMENT OF IDIOPATHIC HYPOHIDROSIS," both of which are incorporated herein by reference in their entirety for all purposes.

FIELD OF INVENTION

The present invention relates to a new treatment for idiopathic hypohidrosis. In particular, the invention relates to the use of retinoid compounds to treat idiopathic hypohidrosis.

BACKGROUND

The listing or discussion of a prior-published document in this specification should not necessarily be taken as an acknowledgement that the document is part of the state of the art or is common general knowledge.

Death from heat injury is frequently reported worldwide in soldiers, athletes, construction workers and the elderly. Hypohidrosis refers to a reduced ability sweat and can be a cause of such fatal heat injuries. These deaths can be prevented if such individuals can be treated.

Hypohidrosis can lead to fatal heat injuries and Lim et al. have previously found that 31% of previously-healthy heat injury sufferers had underlying hypohidrosis (Lim J H L, Kok W L, Chong W S, Tey H L., *Dermatology*. 2016; 232(1):50-6).

Some incidences of hypohidrosis are secondary incidences of hypohidrosis and have a determinable cause, such as drug side-effects or a disease (e.g. a neurological, endocrine, metabolic or clinically-apparent skin disease (Chia K Y, Tey H L., *J Eur Acad Dermatol Venereol.* 2013; 27(7): 799-804 and Ohshima Y, Tamada Y., *Curr Probl Dermatol.* 2016; 51:7-10)).

However, in most patients presenting with hypohidrosis, there is no attributable or secondary cause. The skin of these patients appears both clinically and histologically normal, which means that the cause of hypohidrosis is unknown. Such cases are classified as idiopathic or primary hypohidrosis. Hypohidrosis has been recognized as the absence of sweat affecting >40% of body surface area (BSA) (Lim J H L, Kok W L, Chong W S, Tey H L., *Dermatology.* 2016; 232(1):50-6). Idiopathic hypohidrosis can affect the body in a generalised or partial manner. Generalised hypohidrosis is commonly diagnosed as Acquired Idiopathic Generalised Anhidrosis (AIGA). Generalized hypohidrosis can be defined as hypohidrosis affecting >70% BSA, while partial hypohidrosis as affecting 40-70% BSA.

Because the skin of a patient suffering from idiopathic hypohidrosis appears both clinically and histologically normal, the pathogenesis of idiopathic hypohidrosis has been unknown. The absence of a known cause distinguishes idiopathic hypohidrosis from secondary hypohidrosis, such as that caused by clinically-apparent skin diseases such as miliaria, congenital lamellar ichthyosis and mycosis fungoides. Idiopathic hypohidrosis is therefore a separate clinical indication from secondary hypohidrosis. Idiopathic hypohidrosis is a chronic condition and management of the disease has previously required patients to avoid physical exertion or other activities which could result in dangerous overheating, requiring substantial detrimental lifestyle changes. There is no known effective treatment for idiopathic hypohidrosis, with treatment options being limited to avoiding aggravating factors.

There is therefore a long-felt need to develop an effective treatment for idiopathic hypohidrosis.

SUMMARY OF INVENTION

The inventor has investigated the location of the pathology in idiopathic hypohidrosis. Injection of Carbachol (Miostat), a cholinomimetic drug, induced sweating at regions where patients could sweat, but could not do so in areas where patients cannot sweat. This indicates that the problem lies in the sweat apparatus (glands or ducts) and not in the nervous innervation of the sweat glands. Histological examination of anhidrotic skin reviewed normal morphology and number of sweat glands. Results of immunohistochemical staining for antibodies against $M_3$ muscarinic acetylcholine receptors on the sweat glands were negative/normal. This indicates that the pathology may not lie in the sweat gland, but may lie in the sweat ducts.

It has now surprisingly been found that the sweat ducts of patients suffering from idiopathic hypohidrosis were blocked with keratin plugs, resulting in an inability to sweat. The inventor has further surprisingly found that administration of retinoids has efficacy in treating idiopathic hypohidrosis. In particular, the systemic administration of isotretinoin or acitretin has surprisingly been found to be efficacious in the treatment of idiopathic hypohidrosis.

Aspects and embodiments of the invention will now be described by reference to the following numbered clauses.

1. Use of a retinoid in the manufacture of a medicament for the treatment of idiopathic hypohidrosis.
2. Use according to Clause 1, wherein the retinoid is isotretinoin or acitretin, or a pharmaceutically acceptable salt, solvate or derivative thereof.
3. Use according to Clause 1 or 2, wherein the retinoid is isotretinoin or a pharmaceutically acceptable salt, solvate or derivative thereof.
4. Use according to Clause 1 or 2, wherein the retinoid is acitretin or a pharmaceutically acceptable salt, solvate or derivative thereof.
5. Use according to any one of Clauses 1 to 4, wherein the medicament is for systemic administration.
6. Use according to Clause 5, wherein the medicament is for oral administration.
7. Use according to any one of Clauses 1 to 6, wherein the medicament is for daily administration at a dose of from 5 to about 75 mg/day, typically about 8 to about 50 mg/day, more typically about 10 to about 40 mg/day.
8. Use according to any one of Clauses 1 to 7, wherein the medicament is for the treatment of idiopathic hypohidrosis in a patient not suffering from secondary hypohidrosis.
9. A retinoid for use in the treatment of idiopathic hypohidrosis.
10. A retinoid for use according to Clause 9 wherein the retinoid is isotretinoin or acitretin, or a pharmaceutically acceptable salt, solvate or derivative thereof.

11. A retinoid for use according to Clause 9 or Clause 10 wherein the retinoid is isotretinoin or a pharmaceutically acceptable salt, solvate or derivative thereof.
12. A retinoid for use according to Clause 9 or Clause 10 wherein the retinoid is acitretin or a pharmaceutically acceptable salt, solvate or derivative thereof.
13. A retinoid for use according to any one of Clauses 9 to 12 wherein the retinoid is administered systemically.
14. A retinoid for use according to Clause 13, wherein the retinoid is administered orally.
15. A retinoid for use according to any one of Clauses 9 to 14, wherein the retinoid is administered daily at a dose of from 5 to about 75 mg/day, typically about 8 to about 50 mg/day, more typically about 10 to about 40 mg/day.
16. A retinoid for use according to any one of Clauses 9 to 15, wherein the retinoid is for use in the treatment of idiopathic hypohidrosis in a patient not suffering from secondary hypohidrosis.
17. A method of treating idiopathic hypohidrosis in a patient in need thereof, comprising administering to said patient a pharmaceutically effective amount of a retinoid.
18. A method according to Clause 17, wherein the retinoid is isotretinoin or acitretin, or a pharmaceutically acceptable salt, solvate or derivative thereof.
19. A method according to Clause 17 or 18, wherein the retinoid is isotretinoin or a pharmaceutically acceptable salt, solvate or derivative thereof.
20. A method according to Clause 17 or 18, wherein the retinoid is acitretin or a pharmaceutically acceptable salt, solvate or derivative thereof.
21. A method according to any one of Clauses 17 to 20, wherein the retinoid is administered systemically.
22. A method according to Clause 21, wherein the retinoid is administered orally.
23. A method according to any one of Clauses 17 to 22, wherein the retinoid is administered daily at a dose of from 5 to about 75 mg/day, typically about 8 to about 50 mg/day, more typically about 10 to about 40 mg/day.
24. A method according to any one of Clauses 17 to 23, wherein the patient is not suffering from secondary hypohidrosis.

DETAILED DESCRIPTION

Figure 1:
FIG. 1 shows the process of spraying starch-iodine powder over the whole body of a patient using a spray gun to delineate areas of the body that do not sweat.

The present invention provides an effective treatment for idiopathic hypohidrosis. As used herein, "idiopathic hypohidrosis" refers to hypohidrosis which has no attributable cause. In embodiments of the invention, the hypohidrosis has no attributable cause and the patient's skin appears both clinically and histologically normal. Idiopathic hypohidrosis can be distinguished from secondary hypohidrosis because secondary hypohidrosis has a determinable cause, such as drug side-effects or disease (e.g. neurological, endocrine, metabolic or clinically-apparent skin disease). In embodiments of the invention, the patient suffering from idiopathic hypohidrosis is not suffering from secondary hypohidrosis.

As used herein, "hypohidrosis" refers to a reduced ability to sweat, and is typically diagnosed as the absence of ability to sweat affecting 40% or more of body surface area. Hypohidrosis can be classified as generalised (affecting greater than 70% (e.g. 70-100%) of body surface area), or partial (affecting from 40% to 70% of body surface area). Generalised hypohidrosis therefore encompasses the complete inability to sweat, which is termed anhidrosis. As such, generalised idiopathic hypohidrosis as used herein includes Acquired Idiopathic Generalised Anhidrosis.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

As used herein the term "retinoid" means a vitamer, (a compound having vitamin-like activity), of vitamin A, and pharmaceutically acceptable salts, solvates and derivatives thereof. Examples of retinoid compounds include isotretinoin, acitretin, retinol, retinal, tretinoin (retinoic acid), alitretinoin, etretinate, adapalene, bexarotene, tazarotene and pharmaceutically acceptable salts, solvates and derivatives thereof. In embodiments, the retinoid is selected from retinoids having therapeutic activity against idiopathic hypohidrosis. Particular retinoids for use in accordance with the invention are isotretinoin, acitretin and pharmaceutically acceptable salts, solvates and derivatives thereof. In some embodiments, the retinoid for use in accordance with the invention is selected from isotretinoin and pharmaceutically acceptable salts, solvates and derivatives thereof. In other embodiments, the retinoid is selected from acitretin and pharmaceutically acceptable salts, solvates and derivatives thereof.

Isotretinoin is the international non-proprietary name (INN) for the compound having the below formula. Isotretinoin is also known as 13-cis-retinoic acid.

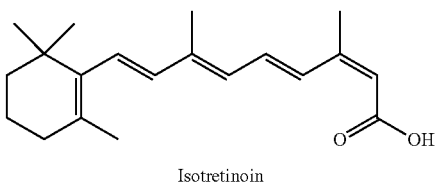 [SMILES: CC1=C(/C=C/C(C)=C/C=C/C(C)=C\C(=O)O)C(C)(C)CCC1]

Isotretinoin

Acitretin is the INN for the compound having the below formula.

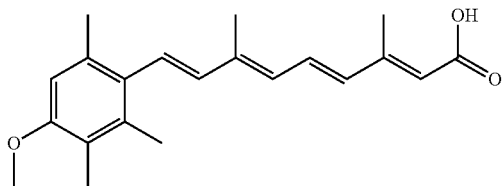

Acitretin

For the avoidance of doubt, in the context of the present invention, the term "treatment" includes references to therapeutic treatment of patients in need of such treatment, as well as to the prophylactic treatment and/or diagnosis of patients which are susceptible to the relevant disease states.

The terms "patient" and "patients" include references to mammalian (e.g. human) patients. As used herein the terms "subject" or "patient" are well-recognized in the art, and, are used interchangeably herein to refer to a mammal, preferably a human. In some embodiments, the subject is a subject in need of treatment or a subject with a disease or disorder. However, in other embodiments, the subject can be a normal subject. The term does not denote a particular age or sex. Thus, adult and newborn subjects, whether male or female, are intended to be covered.

The term "effective amount" refers to an amount of a compound (such as a retinoid), which confers a therapeutic effect on the treated patient (e.g. sufficient to treat or prevent the disease). The effect may be objective (i.e., measurable by some test or marker) or subjective (i.e., the subject gives an indication of or feels an effect).

Further embodiments of the invention that may be mentioned include those in which the retinoid is isotopically labelled. However, other, particular embodiments of the invention that may be mentioned include those in which the retinoid is not isotopically labelled. The term "isotopically labelled", when used herein includes references to retinoids in which there is a non-natural isotope (or a non-natural distribution of isotopes) at one or more positions in the compound. References herein to "one or more positions in the compound" will be understood by those skilled in the art to refer to one or more of the atoms of the retinoid. Thus, the term "isotopically labelled" includes references to retinoids that are isotopically enriched at one or more positions in the compound. The isotopic labelling or enrichment of the compound of formula I may be with a radioactive or non-radioactive isotope of any of hydrogen, carbon, nitrogen, oxygen, sulfur, fluorine, chlorine, bromine and/or iodine. Particular isotopes that may be mentioned in this respect include $^2H$, $^3H$, $^{11}C$, $^{13}C$, $^{14}C$, $^{13}N$, $^{15}N$, $^{15}O$, $^{17}O$, $^{18}O$, $^{35}S$, $^{18}F$, $^{37}Cl$, $^{77}Br$, $^{82}Br$ and $^{125}I$.

Salts, Solvates and Derivatives

As mentioned hereinabove, retinoids for use in accordance with the invention may exist as pharmaceutically acceptable salts. Pharmaceutically acceptable salts that may be mentioned include acid addition salts and base addition salts. Such salts may be formed by conventional means, for example by reaction of a free acid or a free base form of a retinoid with one or more equivalents of an appropriate acid or base, optionally in a solvent, or in a medium in which the salt is insoluble, followed by removal of said solvent, or said medium, using standard techniques (e.g. in vacuo, by freeze-drying or by filtration). Salts may also be prepared by exchanging a counter-ion of a retinoid in the form of a salt with another counter-ion, for example using a suitable ion exchange resin.

Examples of pharmaceutically acceptable salts include acid addition salts derived from mineral acids and organic acids, and salts derived from metals such as sodium, magnesium, or preferably, potassium and calcium.

Examples of acid addition salts include acid addition salts formed with acetic, 2,2-dichloroacetic, adipic, alginic, aryl sulphonic acids (e.g. benzenesulphonic, naphthalene-2-sulphonic, naphthalene-1,5-disulphonic and p-toluenesulphonic), ascorbic (e.g. L-ascorbic), L-aspartic, benzoic, 4-acetamidobenzoic, butanoic, (+) camphoric, camphor-sulphonic, (+)-(1 S)-camphor-10-sulphonic, capric, caproic, caprylic, cinnamic, citric, cyclamic, dodecylsulphuric, ethane-1,2-disulphonic, ethanesulphonic, 2-hydroxyethanesulphonic, formic, fumaric, galactaric, gentisic, glucoheptonic, gluconic (e.g. D-gluconic), glucuronic (e.g. D-glucuronic), glutamic (e.g. L-glutamic), α-oxoglutaric, glycolic, hippuric, hydrobromic, hydrochloric, hydriodic, isethionic, lactic (e.g. (+)-L-lactic and (±)-DL-lactic), lactobionic, maleic, malic (e.g. (−)-L-malic), malonic, (±)-DL-mandelic, metaphosphoric, methanesulphonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulphuric, tannic, tartaric (e.g. (+)-L-tartaric), thiocyanic, undecylenic and valeric acids.

Particular examples of salts are salts derived from mineral acids such as hydrochloric, hydrobromic, phosphoric, metaphosphoric, nitric and sulphuric acids; from organic acids, such as tartaric, acetic, citric, malic, lactic, fumaric, benzoic, glycolic, gluconic, succinic, arylsulphonic acids; and from metals such as sodium, magnesium, or preferably, potassium and calcium.

In embodiments of the invention, the retinoid is used in free-base form. Thus, in embodiments the retinoid is isotretinoin or acitretin.

As mentioned above, also encompassed by the present invention are any solvates of the retinoids and their salts. Preferred solvates are solvates formed by the incorporation into the solid state structure (e.g. crystal structure) of the retinoids for use according to the invention of molecules of a non-toxic pharmaceutically acceptable solvent (referred to below as the solvating solvent). Examples of such solvents include water, alcohols (such as ethanol, isopropanol and butanol) and dimethylsulphoxide. Solvates can be prepared by recrystallising the retinoids for use according to the invention with a solvent or mixture of solvents containing the solvating solvent. Whether or not a solvate has been formed in any given instance can be determined by subjecting crystals of the retinoids to analysis using well known and standard techniques such as thermogravimetric analysis (TGE), differential scanning calorimetry (DSC) and X-ray crystallography.

The solvates can be stoichiometric or non-stoichiometric solvates. Particularly preferred solvates are hydrates, and examples of hydrates include hemihydrates, monohydrates and dihydrates.

For a more detailed discussion of solvates and the methods used to make and characterise them, see Bryn et al., *Solid-State Chemistry of Drugs, Second Edition*, published by SSCI, Inc of West Lafayette, IN, USA, 1999, ISBN 0-967-06710-3.

"Pharmaceutically functional derivatives" of retinoids as defined herein includes ester derivatives and/or derivatives that have, or provide for, the same biological function and/or activity as any relevant retinoid for use according to the invention. Thus, for the purposes of this invention, the term also includes prodrugs of retinoids.

The term "prodrug" of a relevant retinoid includes any compound that, following oral or parenteral administration, is metabolised in vivo to form that retinoid in an experimentally-detectable amount, and within a predetermined time (e.g. within a dosing interval of between 6 and 24 hours (i.e., once to four times daily)).

Prodrugs of retinoid compounds may be prepared by modifying functional groups present on the retinoid compound in such a way that the modifications are cleaved, in vivo when such prodrug is administered to a mammalian subject. The modifications typically are achieved by synthesizing the parent retinoid compound with a prodrug substituent. Prodrugs include derivatives of retinoids wherein a hydroxyl, amino, sulfhydryl, carboxyl or carbonyl group in a compound of formula I is bonded to any group that may be cleaved in vivo to regenerate the free hydroxyl, amino, sulfhydryl, carboxyl or carbonyl group, respectively.

Examples of prodrugs include, but are not limited to, esters and carbamates of hydroxyl functional groups, esters groups of carboxyl functional groups, N-acyl derivatives and N-Mannich bases. General information on prodrugs may be found e.g. in Bundgaard, H. "Design of Prodrugs" p. 1-92, Elsevier, New York-Oxford (1985).

Retinoids, as well as pharmaceutically acceptable salts, solvates and pharmaceutically functional derivatives of such retinoids are, for the sake of brevity, hereinafter referred to together simply as "a retinoid" or "retinoids".

Administration

Retinoids for use in accordance with the invention may be administered by any suitable route, but may particularly be administered orally, intravenously, intramuscularly, cutaneously, subcutaneously, transmucosally (e.g. sublingually or buccally), rectally, transdermally, nasally, pulmonarily (e.g. tracheally or bronchially), topically, by any other parenteral route, in the form of a pharmaceutical preparation comprising the retinoid compound in a pharmaceutically acceptable dosage form. Particular modes of administration that may be mentioned include oral, intravenous, cutaneous, subcutaneous, nasal, intramuscular or intraperitoneal administration. Generally, the retinoid will be administered systemically. Typically, the retinoid will be administered orally as this route is preferable from a patient compliance perspective and has been shown to have efficacy in the treatment of idiopathic hypohidrosis.

Retinoids for use in accordance with the invention will generally be administered as a pharmaceutical formulation in admixture with a pharmaceutically acceptable adjuvant, diluent or carrier, which may be selected with due regard to the intended route of administration and standard pharmaceutical practice. Such pharmaceutically acceptable carriers may be chemically inert to the active retinoid compounds and may have no detrimental side effects or toxicity under the conditions of use. Suitable pharmaceutical formulations may be found in, for example, *Remington The Science and Practice of Pharmacy,* 19th ed., Mack Printing Company, Easton, Pennsylvania (1995). For parenteral administration, a parenterally acceptable aqueous solution may be employed, which is pyrogen free and has requisite pH, isotonicity, and stability. Suitable solutions will be well known to the skilled person, with numerous methods being described in the literature. A brief review of methods of drug delivery may also be found in e.g. Langer, *Science* (1990) 249, 1527.

Otherwise, the preparation of suitable formulations may be achieved routinely by the skilled person using routine techniques and/or in accordance with standard and/or accepted pharmaceutical practice.

The amount of retinoid in any pharmaceutical formulation used in accordance with the present invention will depend on various factors, such as the severity of the condition to be treated, the particular patient to be treated, as well as the retinoid compound(s) which is/are employed. In any event, the amount of retinoid in the formulation may be determined routinely by the skilled person.

For example, a solid oral composition such as a tablet or capsule may contain from 1 to 99% (w/w) active ingredient; from 0 to 99% (w/w) diluent or filler; from 0 to 20% (w/w) of a disintegrant; from 0 to 5% (w/w) of a lubricant; from 0 to 5% (w/w) of a flow aid; from 0 to 50% (w/w) of a granulating agent or binder; from 0 to 5% (w/w) of an antioxidant; and from 0 to 5% (w/w) of a pigment. A controlled release tablet may in addition contain from 0 to 90% (w/w) of a release-controlling polymer.

A parenteral formulation (such as a solution or suspension for injection or a solution for infusion) may contain from 1 to 50% (w/w) active ingredient; and from 50% (w/w) to 99% (w/w) of a liquid or semisolid carrier or vehicle (e.g. a solvent such as water); and 0-20% (w/w) of one or more other excipients such as buffering agents, antioxidants, suspension stabilisers, tonicity adjusting agents and preservatives.

Depending on the disorder, and the patient to be treated, as well as the route of administration, retinoids may be administered at varying therapeutically effective doses to a patient in need thereof.

However, the dose administered to a mammal, particularly a human, in the context of the present invention should be sufficient to effect a therapeutic response in the mammal over a reasonable timeframe. One skilled in the art will recognize that the selection of the exact dose and composition and the most appropriate delivery regimen will also be influenced by inter alia the pharmacological properties of the formulation, the nature and severity of the condition being treated, and the physical condition and mental acuity of the recipient, as well as the potency of the specific compound, the age, condition, body weight, sex and response of the patient to be treated, and the stage/severity of the disease.

Administration may be continuous or intermittent (e.g. by bolus injection). The dosage may also be determined by the timing and frequency of administration. In the case of oral or parenteral administration the dosage can vary from about 0.01 mg to about 1000 mg per day of retinoid.

A dose may depend on a patient's weight, and is typically in the range of 0.01 mg/kg/day to 2 mg/kg/day, for example about 0.05 to about 1.5 mg/kg/day, particularly about 0.1 to about 1 mg/kg/day, more particularly about 0.15 to 0.7 about mg/kg/day, such as about 0.2 to about 0.5 mg/kg/day.

Thus for some populations a typical dose could be from about 0.6 to about 120 mg/day, for example about 3 to about 90 mg/day, particularly about 6 to about 60 mg/day, more particularly about 9 to about 42 mg/day, such as about 12 to about 30 mg/day. In other populations a typical dose could be from about 0.75 to about 150 mg/day, for example about 3 to about 100 mg/day, particularly about 7.5 to about 75 mg/day, more particularly about 11 to about 52 mg/day, such as about 15 to about 37 mg/day. It is expected that the effective dose for patients in North American or European countries is likely to be higher than that in Asian countries.

Thus, in general, a typical dose could be from about 0.6 to about 150 mg/day, for example about 3 to about 100 mg/day, particularly about 5 to about 75 mg/day, more particularly about 8 to about 50 mg/day, such as about 10 to about 40 mg/day.

For the avoidance of doubt, it is explicitly contemplated that where a number of numerical ranges related to the same feature are cited herein, that the end points for each range are intended to be combined in any order to provide further contemplated (and implicitly disclosed) ranges. Thus, in relation to the related numerical ranges directly above, there is disclosed:

0.6 to 0.75 mg/day, 0.6 to 3 mg/day, 0.6 to 5 mg/day, 0.6 to 6 mg/day, 0.6 to 7.5 mg/day, 0.6 to 8 mg/day, 0.6 to 9 mg/day, 0.6 to 10 mg/day, 0.6 to 11 mg/day, 0.6 to 12 mg/day, 0.6 to 15 mg/day, 0.6 to 30 mg/day, 0.6 to 37 mg/day, 0.6 to 40 mg/day, 0.6 to 42 mg/day, 0.6 to 50 mg/day, 0.6 to 52 mg/day, 0.6 to 60 mg/day, 0.6 to 75 mg/day, 0.6 to 90 mg/day, 0.6 to 100 mg/day, 0.6 to 120 mg/day, 0.6 to 150 mg/day;

0.75 to 3 mg/day, 0.75 to 5 mg/day, 0.75 to 6 mg/day, 0.75 to 7.5 mg/day, 0.75 to 8 mg/day, 0.75 to 9 mg/day, 0.75 to 10 mg/day, 0.75 to 11 mg/day, 0.75 to 12 mg/day, 0.75 to 15 mg/day, 0.75 to 30 mg/day, 0.75 to 37 mg/day, 0.75 to 40 mg/day, 0.75 to 42 mg/day, 0.75 to 50 mg/day, 0.75 to 52 mg/day, 0.75 to 60 mg/day, 0.75 to 75 mg/day, 0.75 to 90 mg/day, 0.75 to 100 mg/day, 0.75 to 120 mg/day, 0.75 to 150 mg/day;

3 to 5 mg/day, 3 to 6 mg/day, 3 to 7.5 mg/day, 3 to 8 mg/day, 3 to 9 mg/day, 3 to 10 mg/day, 3 to 11 mg/day, 3 to 12 mg/day, 3 to 15 mg/day, 3 to 30 mg/day, 3 to 37 mg/day, 3 to 40 mg/day, 3 to 42 mg/day, 3 to 50 mg/day, 3 to 52 mg/day, 3 to 60 mg/day, 3 to 75 mg/day, 3 to 90 mg/day, 3 to 100 mg/day, 3 to 120 mg/day, 3 to 150 mg/day;

5 to 6 mg/day, 5 to 7.5 mg/day, 5 to 8 mg/day, 5 to 9 mg/day, 5 to 10 mg/day, 5 to 11 mg/day, 5 to 12 mg/day, 5 to 15 mg/day, 5 to 30 mg/day, 5 to 37 mg/day, 5 to 40 mg/day, 5 to 42 mg/day, 5 to 50 mg/day, 5 to 52 mg/day, 5 to 60 mg/day, 5 to 75 mg/day, 5 to 90 mg/day, 5 to 100 mg/day, 5 to 120 mg/day, 5 to 150 mg/day;

6 to 7.5 mg/day, 6 to 8 mg/day, 6 to 9 mg/day, 6 to 10 mg/day, 6 to 11 mg/day, 6 to 12 mg/day, 6 to 15 mg/day, 6 to 30 mg/day, 6 to 37 mg/day, 6 to 40 mg/day, 6 to 42 mg/day, 6 to 50 mg/day, 6 to 52 mg/day, 6 to 60 mg/day, 6 to 75 mg/day, 6 to 90 mg/day, 6 to 100 mg/day, 6 to 120 mg/day, 6 to 150 mg/day;

7.5 to 8 mg/day, 7.5 to 9 mg/day, 7.5 to 10 mg/day, 7.5 to 11 mg/day, 7.5 to 12 mg/day, 7.5 to 15 mg/day, 7.5 to 30 mg/day, 7.5 to 37 mg/day, 7.5 to 40 mg/day, 7.5 to 42 mg/day, 7.5 to 50 mg/day, 7.5 to 52 mg/day, 7.5 to 60 mg/day, 7.5 to 75 mg/day, 7.5 to 90 mg/day, 7.5 to 100 mg/day, 7.5 to 120 mg/day, 7.5 to 150 mg/day;

8 to 9 mg/day, 8 to 10 mg/day, 8 to 11 mg/day, 8 to 12 mg/day, 8 to 15 mg/day, 8 to 30 mg/day, 8 to 37 mg/day, 8 to 40 mg/day, 8 to 42 mg/day, 8 to 50 mg/day, 8 to 52 mg/day, 8 to 60 mg/day, 8 to 75 mg/day, 8 to 90 mg/day, 8 to 100 mg/day, 8 to 120 mg/day, 8 to 150 mg/day;

9 to 10 mg/day, 9 to 11 mg/day, 9 to 12 mg/day, 9 to 15 mg/day, 9 to 30 mg/day, 9 to 37 mg/day, 9 to 40 mg/day, 9 to 42 mg/day, 9 to 50 mg/day, 9 to 52 mg/day, 9 to 60 mg/day, 9 to 75 mg/day, 9 to 90 mg/day, 9 to 100 mg/day, 9 to 120 mg/day, 9 to 150 mg/day;

10 to 11 mg/day, 10 to 12 mg/day, 10 to 15 mg/day, 10 to 30 mg/day, 10 to 37 mg/day, 10 to 40 mg/day, 10 to 42 mg/day, 10 to 50 mg/day, 10 to 52 mg/day, 10 to 60 mg/day, 10 to 75 mg/day, 10 to 90 mg/day, 10 to 100 mg/day, 10 to 120 mg/day, 10 to 150 mg/day;

11 to 12 mg/day, 11 to 15 mg/day, 11 to 30 mg/day, 11 to 37 mg/day, 11 to 40 mg/day, 11 to 42 mg/day, 11 to 50 mg/day, 11 to 52 mg/day, 11 to 60 mg/day, 11 to 75 mg/day, 11 to 90 mg/day, 11 to 100 mg/day, 11 to 120 mg/day, 11 to 150 mg/day;

12 to 15 mg/day, 12 to 30 mg/day, 12 to 37 mg/day, 12 to 40 mg/day, 12 to 42 mg/day, 12 to 50 mg/day, 12 to 52 mg/day, 12 to 60 mg/day, 12 to 75 mg/day, 12 to 90 mg/day, 12 to 100 mg/day, 12 to 120 mg/day, 12 to 150 mg/day;

15 to 30 mg/day, 15 to 37 mg/day, 15 to 40 mg/day, 15 to 42 mg/day, 15 to 50 mg/day, 15 to 52 mg/day, 15 to 60 mg/day, 15 to 75 mg/day, 15 to 90 mg/day, 15 to 100 mg/day, 15 to 120 mg/day, 15 to 150 mg/day;

30 to 37 mg/day, 30 to 40 mg/day, 30 to 42 mg/day, 30 to 50 mg/day, 30 to 52 mg/day, 30 to 60 mg/day, 30 to 75 mg/day, 30 to 90 mg/day, 30 to 100 mg/day, 30 to 120 mg/day, 30 to 150 mg/day;

37 to 40 mg/day, 37 to 42 mg/day, 37 to 50 mg/day, 37 to 52 mg/day, 37 to 60 mg/day, 37 to 75 mg/day, 37 to 90 mg/day, 37 to 100 mg/day, 37 to 120 mg/day, 37 to 150 mg/day; 40 to 42 mg/day, 40 to 50 mg/day, 40 to 52 mg/day, 40 to 60 mg/day, 40 to 75 mg/day, 40 to 90 mg/day, 40 to 100 mg/day, 40 to 120 mg/day, 40 to 150 mg/day; 42 to 50 mg/day, 42 to 52 mg/day, 42 to 60 mg/day, 42 to 75 mg/day, 42 to 90 mg/day, 42 to 100 mg/day, 42 to 120 mg/day, 42 to 150 mg/day;

50 to 52 mg/day, 50 to 60 mg/day, 50 to 75 mg/day, 50 to 90 mg/day, 50 to 100 mg/day, 50 to 120 mg/day, 50 to 150 mg/day;

52 to 60 mg/day, 52 to 75 mg/day, 52 to 90 mg/day, 52 to 100 mg/day, 52 to 120 mg/day, 52 to 150 mg/day;

60 to 75 mg/day, 60 to 90 mg/day, 60 to 100 mg/day, 60 to 120 mg/day, 60 to 150 mg/day;

75 to 90 mg/day, 75 to 100 mg/day, 75 to 120 mg/day, 75 to 150 mg/day;

90 to 100 mg/day, 90 to 120 mg/day, 90 to 150 mg/day; 100 to 120 mg/day, 100 to 150 mg/day; and 120 to 150 mg/day.

Typically, a dose required to treat idiopathic hypohidrosis will be higher than a dose required to prevent idiopathic hypohidrosis. Therefore, in embodiments an initial higher dose will be administered to treat idiopathic hypohidrosis in a patient, followed by a gradual lower tapered dose after symptoms have resolved (e.g. when a patient is able to sweat) to prevent recurrence.

Thus, an initial higher dose could be selected from the appropriate ranges above. A lower tapered dose could be achieved by reducing the dose administered per day, the frequency of the dose, or both. For example, the dose could be reduced by a factor of at least 1.5, such as by a factor of 2, a factor of 3, or a factor of 4. Alternatively, or in addition, the dose could be changed to a less frequent dose. For example, a daily dose could be reduced to 6 times a week, 5 times a week, 4 times a week, 3 times a week, two times a week, once a week, or once every two weeks.

In any event, the medical practitioner, or other skilled person, will be able to determine routinely the actual dosage which will be most suitable for an individual patient. The above-mentioned dosages are exemplary of the average case; there can, of course, be individual instances where higher or lower dosage ranges are merited, and such are within the scope of this invention.

Advantages

Retinoids for use in accordance with the invention have the advantage that they have efficacy in the treatment of idiopathic hypohidrosis, which has previously been untreatable. Thus, a patient will have the ability to sweat where they were previously unable. This enables the safe participation in physical activity in hot climates, reducing the risk of overheating and overheating-related injuries.

The invention will now be described by the following non-limiting examples.

EXAMPLES

Example 1: Treatment of Fourteen Patients with Idiopathic Hypohidrosis

Methods

Figure 2:
FIG. 2 shows a patient with partial idiopathic hypohidrosis who could only sweat on the back and shoulders. The coat of starch-iodine powder on the skin turned purple in these areas. The other areas where there was an absence of sweating did not change colour.

Fourteen patients presenting with idiopathic hypohidrosis underwent monitored exercising on a stationary bicycle for 20 minutes. Their temperature and heart rate were repeatedly measured during the exercise. Subsequently, using a spray gun, starch-iodine powder was sprayed onto the whole body of the patient and the powder coats onto the skin (FIG. 1). The coat of powder on body areas with sweating turned purple, while the powder in areas without sweat remained brown (FIG. 2). This allows the body surface area of anhidrosis to be assessed. Thereafter, the patient rinsed off the powder, which washed off easily with water.

The patients' skin was subsequently imaged using high-definition optical coherence tomography (HD-OCT) non-invasive skin imaging (Skintell, Agfa, Belgium). HD-OCT uses an infrared (1000-1700 nm), interferometric and time-domain imaging technique. Instead of a single pin diode light detector, it uses a two-dimensional imaging array to allow for simultaneous cross-sectional and en face images acquisition. A high lateral resolution of 3 µm is ensured using a technique called continuous focus tracking. The capture of a 3D image (containing 57 million voxels) takes 2-3 seconds and the information acquired can subsequently be digitally analysed.

Controls were 14 healthy individuals without hypohidrosis. Another six control subjects further underwent exercising and imaging was performed post-exercise.

Results

Amongst the 14 patients, 8 had generalized idiopathic hypohidrosis while 6 had partial idiopathic hypohidrosis.

Figure 3:
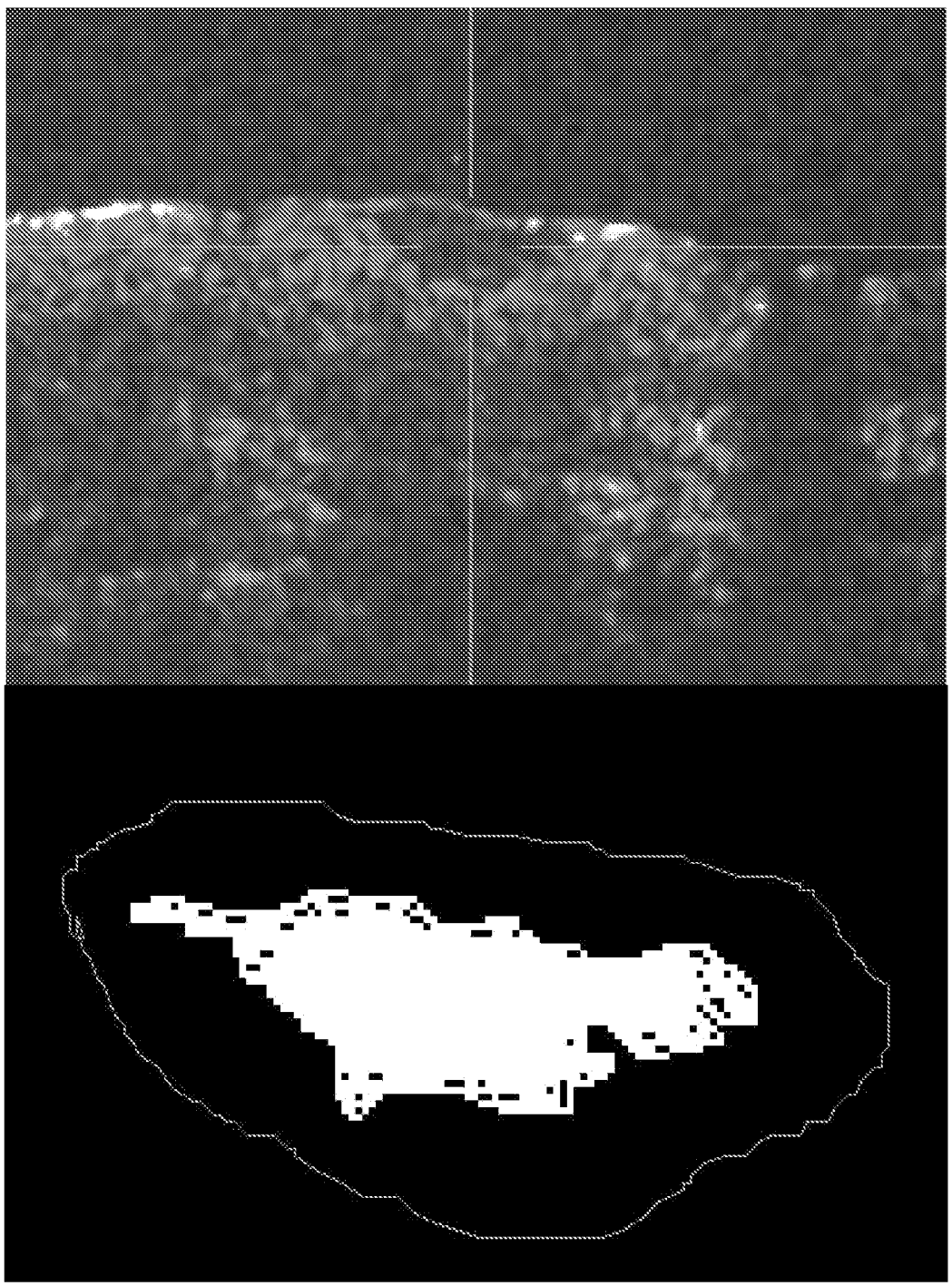
FIG. 3 is a slice image in High-definition Optical Coherence Tomography (Skintell, Agfa, Belgium) revealing a fluid collection under the stratum corneum, and this area can be quantified using digital analysis.
Figure 4:
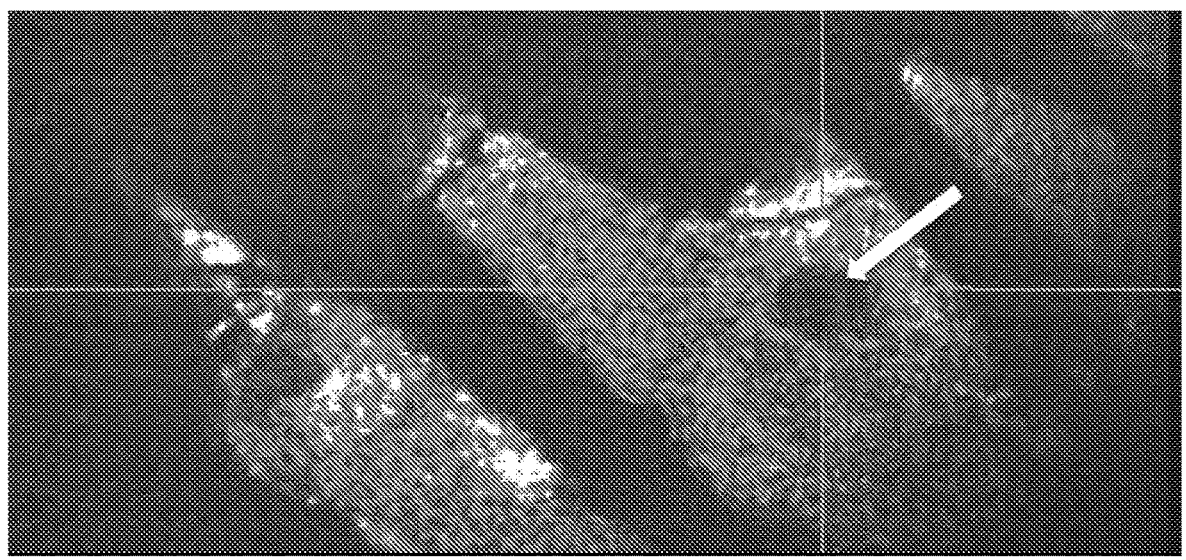
FIG. 4 Sequential en face images revealed a spiraling sweat duct within the fluid cavity (arrowed).

HD-OCT three-dimensional imaging data for the 14 patients and 19 healthy controls were analysed. Features present in all cases of idiopathic hypohidrosis and absent in all controls were identified: intraepidermal lesions comprising a subcorneal fluid cavity (FIG. 3) overlying dilated sweat duct (FIG. 4). These findings indicate obstruction of the sweat ducts at the sweat orifice on the skin surface.

Figure 5:
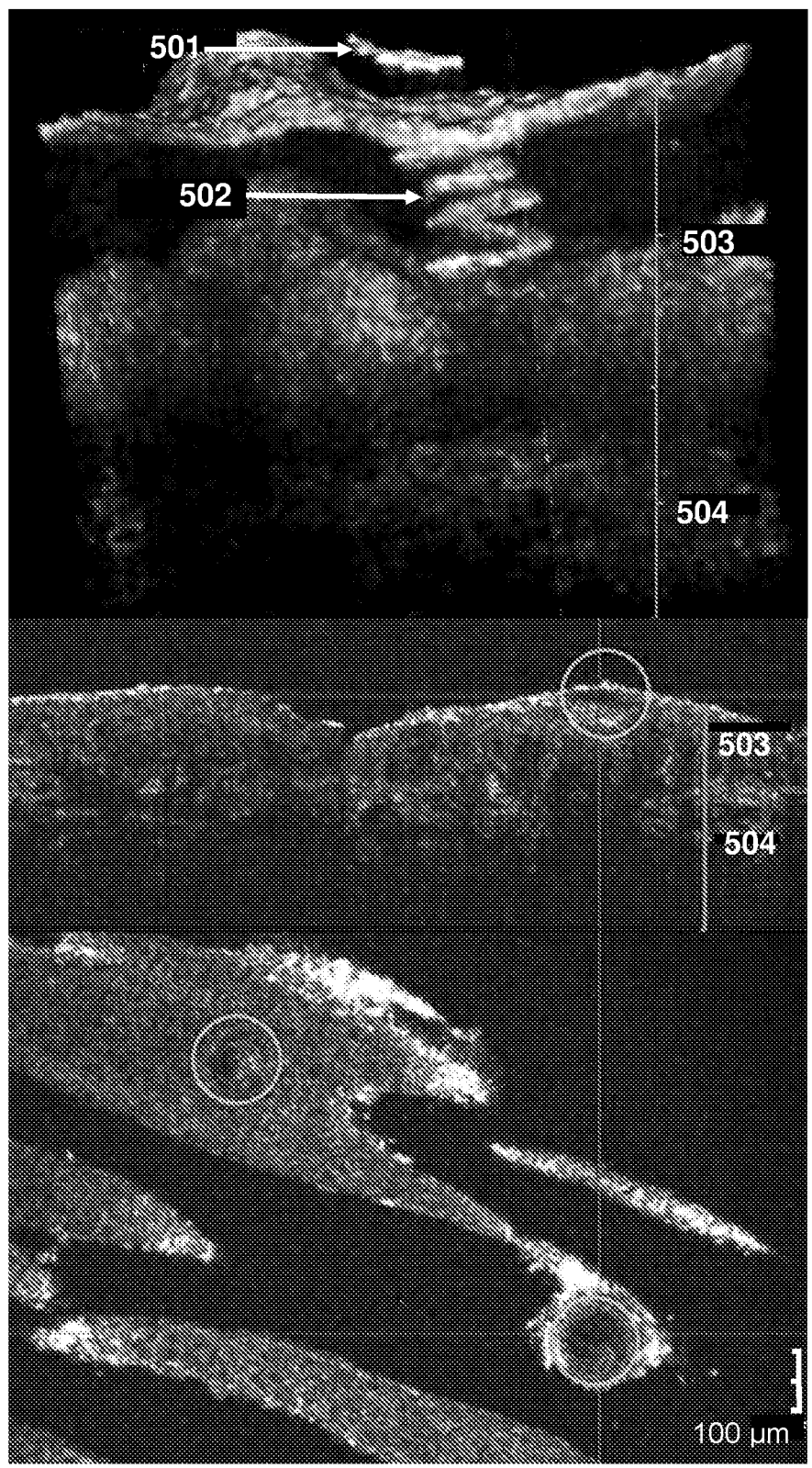
FIG. 5 shows a reconstructed 3D high-definition optical coherence tomography (HD-OCT) image (top) demonstrating Aluminium Chloride particle above the sweat duct (acrosyringium) and HD-OCT slice and en face images (bottom) revealing lesions to those visualized in patients with idiopathic hypohidrosis.

To artificially recreate the obstruction of sweat ducts at the sweat orifices, aluminium hexachloride was applied to delineated body areas of a healthy volunteer. Aluminium hexachloride is known to induce blockage of sweat orifices and hypohidrosis. After one week of daily application, HD-OCT was performed on the applied areas and lesions similar to those found in patients with idiopathic hypohidrosis were visualized (FIG. 5). 501 shows an aluminium chloride particle, 502 shows the acrosyringium, 503 shows the epidermis and 504 shows the dermis.

Figure 6:
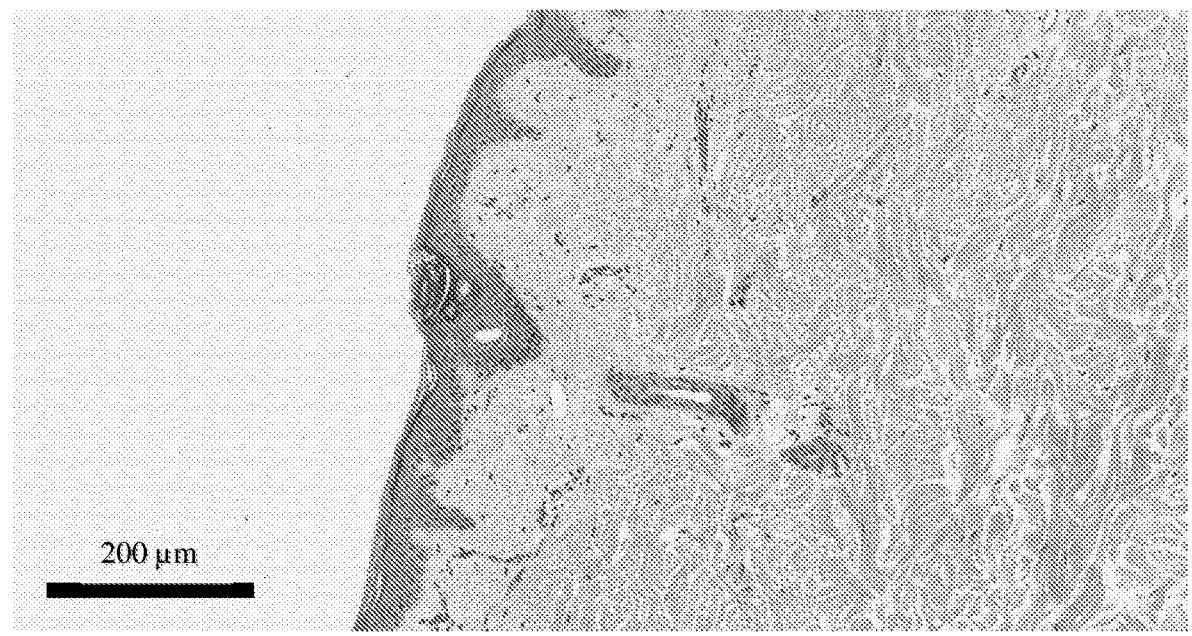
FIG. 6 shows a skin histological slides of a patient with idiopathic hypohidrosis. Keratin plugs are visible at the sweat orifices.

Skin histological slides of 3 patients with idiopathic hypohidrosis were analysed. Keratin plugs were observed at the sweat orifices (FIG. 6). Combining the information from the aforementioned clinical, HD-OCT and histological studies, the data indicates that obstruction of the sweat orifice by keratin resulted in the inability to sweat in idiopathic hypohidrosis.

The fourteen patients suffering from idiopathic hypohidrosis were offered treatment according to the invention.

Eight of the patients were diagnosed with generalised hypohidrosis. Of these, three were treated with acitretin and five treated with isotretinoin. All five of the patients treated with isotretinoin responded and were successfully treated. Two of the three patients treated with acitretin were successfully treated, while one did not respond.

The other six patients were diagnosed with partial hypohidrosis. One refused treatment and the remaining five were treated with isotretinoin. All five responded to treatment and were successfully treated.

The total response rate to retinoids was therefore 12/13 (92%).

All of the treated patients were started on an oral dose of isotretinoin or acitretin of between 5 and 20 mg once daily for at least six weeks. If necessary, this dose was adjusted, whether increased because the initial dose was ineffective, or decreased to reduce the expected side effects associated with oral retinoids. All patients responded to a dose of between 10 and 30 mg once daily. This dose was further adjusted as required until symptoms of idiopathic hypohidrosis had resolved. Administration of retinoids was continued to prevent reoccurrence of symptoms.

Four patients have finished treatment, and their total treatment time was between 8 and 15 months. To the best of the inventor's knowledge, these patients have remained symptom free since treatment was concluded (a period of up to 9 months).

The remaining 9 treated patients are on a continued tapered dose to prevent reoccurrence of symptoms (total time of treatment from 4 to 19 months).

No unexpected side effects were observed in any of the patients. In order to alleviate side effects associated with oral administration of retinoids, lip balm was given to all patients. Moisturisers were provided to those with dry skin and lipid-lowering agents provided to those with hyperlipidemia.

One of the patients successfully treated with isotretinoin underwent a sweat test which demonstrated normalised extent of sweating. HD-OCT imaging revealed that the lesions described above were no longer visible.

Example 2: Long Term Assessment of 28 Patients Suffering from Idiopathic Hypohidrosis Methods A retrospective analysis on patients with isolated hypohidrosis who attended a neuro-dermatology clinic over a 5.75-year period was conducted. All patients routinely underwent standardized exercising and whole-body starch-iodine test, followed by non-invasive HD-OCT skin imaging, and their treatment history was analysed.

Results 28 patients with idiopathic hypohidrosis were included in the study, 14 of whom were affected in a generalised manner (with 70% and more of body surface affected) and 14 in a partial manner. 14 of the 28 patients were those which were the subject of Example 1, and 14 patients were new.

Substratum corneal hypo-refractile collections with underlying dilated sweat ducts were unique in HD-OCT images of patients compared to site-matched images of healthy controls. Twenty patients received treatment with retinoids, which were either oral isotretinoin or acitretin. Seventeen patients (7 generalised and 10 partial) were treated with isotretinoin and all (100%) of them recovered well enough to return to their pre-morbid sporting activities. Three patients were treated with acitretin and 2 patients recovered, while one patient did not respond to treatment. Among patients who responded to treatment, no recurrence has been reported after 357.3-629.8 days. Side effects were predominantly anticipated: 100% had dry lips, one patient (5%) had dry skin and one patient (5%) developed facial acne.

CONCLUSION

Pathogenesis of idiopathic hypohidrosis involves obstruction of sweat orifices at the stratum corneum. Treatment with oral retinoids, particularly isotretinoin, is effective and safe in this study.

It is clear from the above Examples that systemic (oral) administration of retinoids has efficacy in the treatment of idiopathic hypohidrosis, which was previously untreatable.

The invention claimed is:

1. A method comprising utilizing a retinoid in the manufacture of a medicament for the treatment of idiopathic hypohidrosis.

2. The method according to claim 1, wherein the retinoid is isotretinoin, acitretin, retinol, retinal, tretinoin (retinoic acid), alitretinoin, etretinate, adapalene, bexarotene, tazarotene, or a pharmaceutically acceptable salt, solvate or derivative thereof,
   wherein the retinoid is used in free-base form, or
   the solvate is a stoichiometric or non-stoichiometric solvate formed in a solvent selected from water, alcohols, and dimethylsulphoxide; or
   the salt is acid addition salts formed with acetic, 2,2-dichloroacetic, adipic, alginic, aryl sulphonic acids (i.e., benzenesulphonic, naphthalene-2-sulphonic, naphthalene-1,5-disulphonic and p-toluenesulphonic), ascorbic (i.e., L-ascorbic), L-aspartic, benzoic, 4-acetamidobenzoic, butanoic, (+) camphoric, camphor-sulphonic, (+)-(1S)-camphor-10-sulphonic, capric, caproic, caprylic, cinnamic, citric, cyclamic, dodecylsulphuric, ethane-1,2-disulphonic, ethanesulphonic, 2-hydroxyethanesulphonic, formic, fumaric, galactaric, gentisic, glucoheptonic, gluconic (i.e., D-gluconic), glucuronic (i.e., D-glucuronic), glutamic (i.e., L-glutamic), α-oxoglutaric, glycolic, hippuric, hydrobromic, hydrochloric, hydriodic, isethionic, lactic (i.e., (+)-L-lactic and (±)-DL-lactic), lactobionic, maleic, malic (i.e., (−)-L-malic), malonic, (±)-DL-mandelic, metaphosphoric, methanesulphonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulphuric, tannic, tartaric (i.e., (+)-L-tartaric), thiocyanic, undecylenic and valeric acids, salts derived from mineral acids selected from hydrochloric, hydrobromic, phosphoric, metaphosphoric, nitric and sulphuric acids; from organic acids selected from tartaric, acetic, citric, malic, lactic, fumaric, benzoic, glycolic, gluconic, succinic, arylsulphonic acids; and from metals selected from sodium, magnesium, potassium and calcium, or
   the derivative is a prodrug of the retinoid.

3. The method according to claim 1, wherein the retinoid is isotretinoin or a pharmaceutically acceptable salt, solvate or derivative thereof,
   wherein the retinoid is used in free-base form, or
   the solvate is a stoichiometric or non-stoichiometric solvate formed in a solvent selected from water, alcohols, and dimethylsulphoxide; or
   the salt is acid addition salts formed with acetic, 2,2-dichloroacetic, adipic, alginic, aryl sulphonic acids (i.e., benzenesulphonic, naphthalene-2-sulphonic, naphthalene-1,5-disulphonic and p-toluenesulphonic), ascorbic (i.e., L-ascorbic), L-aspartic, benzoic, 4-acetamidobenzoic, butanoic, (+) camphoric, camphor-sulphonic, (+)-(1S)-camphor-10-sulphonic, capric, caproic, caprylic, cinnamic, citric, cyclamic, dodecylsulphuric, ethane-1,2-disulphonic, ethanesulphonic, 2-hydroxyethanesulphonic, formic, fumaric, galactaric, gentisic, glucoheptonic, gluconic (i.e., D-gluconic), glucuronic (i.e., D-glucuronic), glutamic (i.e., L-glutamic), α-oxoglutaric, glycolic, hippuric, hydrobromic, hydrochloric, hydriodic, isethionic, lactic (i.e., (+)-L-lactic and (±)-DL-lactic), lactobionic, maleic, malic (i.e., (−)-L-malic), malonic, (±)-DL-mandelic, metaphosphoric, methanesulphonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulphuric, tannic, tartaric (i.e., (+)-L-tartaric), thiocyanic, undecylenic and valeric acids, salts derived from mineral acids selected from hydrochloric, hydrobromic, phosphoric, metaphosphoric, nitric and sulphuric acids; from organic acids selected from tartaric, acetic, citric, malic, lactic, fumaric, benzoic, glycolic, gluconic, succinic, arylsulphonic acids; and from metals selected from sodium, magnesium, potassium and calcium, or
   the derivative is a prodrug of the retinoid.

4. The method according to claim 1, wherein the retinoid is acitretin or a pharmaceutically acceptable salt, solvate or derivative thereof,
   wherein the retinoid is used in free-base form, or
   the solvate is a stoichiometric or non-stoichiometric solvate formed in a solvent selected from water, alcohols, and dimethylsulphoxide; or
   the salt is acid addition salts formed with acetic, 2,2-dichloroacetic, adipic, alginic, aryl sulphonic acids (i.e., benzenesulphonic, naphthalene-2-sulphonic, naphthalene-1,5-disulphonic and p-toluenesulphonic), ascorbic (i.e., L-ascorbic), L-aspartic, benzoic, 4-acetamidobenzoic, butanoic, (+) camphoric, camphor-sulphonic, (+)-(1S)-camphor-10-sulphonic, capric, caproic, caprylic, cinnamic, citric, cyclamic, dodecylsulphuric, ethane-1,2-disulphonic, ethanesulphonic, 2-hydroxyethanesulphonic, formic, fumaric, galactaric, gentisic, glucoheptonic, gluconic (i.e., D-gluconic), glucuronic (i.e., D-glucuronic), glutamic (i.e., L-glutamic), α-oxoglutaric, glycolic, hippuric, hydrobromic, hydrochloric, hydriodic, isethionic, lactic (i.e., (+)-L-lactic and (±)-DL-lactic), lactobionic, maleic, malic (i.e., (−)-L-malic), malonic, (±)-DL-mandelic, metaphosphoric, methanesulphonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulphuric, tannic, tartaric (i.e., (+)-L-tartaric), thiocyanic, undecylenic and valeric acids, salts derived from mineral acids selected from hydrochloric, hydrobromic, phosphoric, metaphosphoric, nitric and sulphuric acids; from organic acids selected from tartaric, acetic, citric, malic, lactic, fumaric, benzoic, glycolic, gluconic, succinic, arylsulphonic acids; and from metals selected from sodium, magnesium, potassium and calcium, or the derivative is a prodrug of the retinoid.

5. The method according to claim 1, wherein the medicament is for systemic administration.

6. The method according to claim 5, wherein the medicament is for oral administration.

7. The method according to claim 1, wherein the medicament is for daily administration at a dose of from 5 to about 75 mg/day.

8. The method according to claim 1, wherein the medicament is for the treatment of idiopathic hypohidrosis in a patient not suffering from secondary hypohidrosis.

9. The method according to claim 1, wherein the medicament is for daily administration at a dose of from about 8 to about 50 mg/day.

10. The method according to claim 1, wherein the medicament is for daily administration at a dose of from about 10 to about 40 mg/day.

* * * * *